US006368204B1

(12) United States Patent
Tokoyoda

(10) Patent No.: US 6,368,204 B1
(45) Date of Patent: Apr. 9, 2002

(54) COIN DISPENSER ARRANGEMENT

(75) Inventor: Yuji Tokoyoda, Tokyo (JP)

(73) Assignee: Aruze Corporation, Tokyo (JP)

( * ) Notice: Subject to any disclaimer, the term of this patent is extended or adjusted under 35 U.S.C. 154(b) by 0 days.

(21) Appl. No.: 09/410,131

(22) Filed: Sep. 30, 1999

(30) Foreign Application Priority Data

Oct. 2, 1998 (JP) .......................................... 10-281186

(51) Int. Cl.[7] .......................... B65G 47/24; G07D 1/00
(52) U.S. Cl. .......................... 453/57; 194/344; 198/416
(58) Field of Search ............................ 453/32, 50, 57; 221/222, 267; 194/342, 343, 344; 198/412, 416, 624

(56) References Cited

U.S. PATENT DOCUMENTS

| | | | | |
|---|---|---|---|---|
| 5,170,874 A | * | 12/1992 | Abe | 453/57 X |
| 5,232,398 A | | 8/1993 | Maki | 453/57 |
| 5,370,211 A | | 12/1994 | Plana | 194/344 |
| 6,095,916 A | * | 7/1998 | Tamaki | 453/57 |

FOREIGN PATENT DOCUMENTS

| | | | | |
|---|---|---|---|---|
| GB | 2250969 | * | 6/1992 | 198/624 |
| WO | 91/10974 A | | 7/1991 | G07D/1/00 |
| WO | 93/21606 A | | 10/1993 | G07D/3/04 |
| WO | 97/18535 A | | 5/1997 | |

* cited by examiner

*Primary Examiner*—F. J. Bartuska
(74) *Attorney, Agent, or Firm*—Rohm & Monsanto, PLC

(57) ABSTRACT

A coin dispenser arrangement for a gaming machine has a bucket portion for accommodating a plurality of coins and discharging the coins one-by-one, and a passage for guiding the discharged coins to a predetermined position, wherein the passage has a coin orientation adjustment arrangement for changing the orientation of the discharged coin to an optional orientation. Because the orientation of coin discharged from the bucket portion can be changed optionally by the coin orientation adjustment arrangement, the passage does not need to have a gently sloped curve for changing the orientation of coin. The inside space of the housing of gaming machine can be reduced due to the shortening of the passage as a result of the elimination of the curve. The time required for paying out coins can be shortened. Also, when the curve is eliminated, coin jamming rarely occurs and the coins can be paid out smoothly.

14 Claims, 5 Drawing Sheets

COIN DISPENSER ARRANGEMENT

BACKGROUND OF THE INVENTION

1. Field of the Invention

This invention relates to a coin dispenser arrangement installed in a gaming machine such as a slot machine or the like that is played by using a playing medium such as a coin or a medal (hereinafter, called "coin").

2. Description of the Related Art

A coin dispenser arrangement for a gaming machine is a device for paying out one-by-one coins from in a bucket. A known coin dispenser arrangement has a structure by which a coin is guided to a higher (i.e., elevated) position than the coin discharge slot of the bucket. This coin dispenser arrangement is known as an "escalator type" coin dispenser arrangement.

The known escalator type coin dispenser arrangement has a bucket portion that accommodates a plurality of coins, a coin discharge disk that is disposed inclined to a horizontal plane in the bucket and is driven into rotation in the inclined plane, and a coin discharge slot. A passage for guiding the coins after each of which has passed though the coin discharge slot is also provided, whereby the coins are elevated to a predetermined upper position. The referenced structure is installed on a supporting stand.

In operation, the coins that are contained in the bucket are carried to the coin discharge slot one-by-one by means of the coin discharge disk, and each coin that is passed though the coin discharge slot is pushed into a bottom end of the passage, moved in the passage up to the upper end of the passage, and paid out through a coin outlet.

A coin is pushed out of the bucket and into the passage through the coin discharge slot in an inclined condition because the coin discharge disk is itself inclined with respect to a horizontal plane. Similarly, the coin discharge slot is also inclined. Accordingly, the passage for guiding the coins to the coin outlet in upper position has a gently sloped curve that gradually changes the orientation of the coins from the inclined condition to a vertical condition.

Installation of the known escalator type coin dispenser arrangement having a curved passage that functions as previously described requires a large volume within its housing. Also, the coins in the curved passage often jam. In addition, significant time is required to pay out coins because each coin that is been discharged from the bucket must travel along a long passage to arrive at the coin outlet in the upper position.

SUMMARY OF THE INVENTION

An object of this invention is to provide a coin dispenser arrangement by which coins can be smoothly paid out, wherein a passage for guiding coins discharged from a bucket up to a coin outlet in upper position is formed short so that space can be saved, time required for movement of coins is shortened, and further coin clogging rarely occurs.

According to the present invention, there is provided a coin dispenser arrangement for a gaming machine having a bucket portion for retaining an accumulation of coins, the coins being discharged one-by-one from the bucket portion. Additionally, there is provided a passage for guiding the discharged coins to a predetermined position, the passage having a coin orientation adjustment arrangement for changing the orientation of the discharged coin to a predetermined orientation.

The orientation of the coins discharged from the bucket portion can be changed to a desired orientation by the coin orientation adjustment arrangement. As a result, the passage does not need to have a gently sloped curve, as do prior art arrangements, for changing the orientation of coin. The need for space inside of the housing of gaming machine is reduced due to the shortening of the passage that results from the elimination of the curve. Also, elimination of the curve results in a significant reduction in coin jamming.

In a preferred embodiment of the invention, the coin orientation adjustment arrangement has two rollers disposed respectively on the right and left sides of the passage to which the discharged coins are conducted. Additionally, there is provided a drive source for driving the rollers into rotation, which is arranged so that the pair of rollers may be rotated facing each other to permit introduction, or insertion, of the coin therebetween. Such rotation urges the coin forward while the coin orientation simultaneously is changed to a vertical condition in this specific illustrative embodiment of the invention. The orientation of the coin that is discharged from the bucket portion, therefore, is changed to vertical orientation by the coin orientation adjustment arrangement, and the vertically oriented coin is then moved upwards. Accordingly, it is unnecessary to form a gently sloped curve in the passage. The coin can be led directly to an upward passage and can smoothly be move to the coin outlet at the upper end of the passage. In addition, the coin is urged forward by operation of the rotating rollers which serve to push out the coin.

In one embodiment, the respective shafts of the pair of rollers are laterally bidirectionally displaceable so as to reduce the effect of a shock load that would be transmitted to the rollers and the coin when the coin enters the region between the rollers. At least one of the rollers is chamfered at its upper roll edge, and the other is chamfered at a lower edge. Thus, the inclined coin is easily pulled between the right and the left rollers. Consequently, the orientation of the coin can smoothly be changed.

The coin orientation adjustment arrangement changes the orientation of the coin at a speed that is responsive to the rotary speed of the pair of rollers. Moreover, the coin orientation can be changed immediately by the rollers which can be rotated at a high speed and located immediately beyond the discharge point of the coins from the bucket portion. In this manner, reorientation of the coins to a vertical condition is effected much more rapidly than with the use of the gently sloped curve of the prior art arrangements.

BRIEF DESCRIPTION OF THE DRAWING

Comprehension of the invention is facilitated by reading the following detailed description, in conjunction with the annexed drawing, in which.

DETAILED DESCRIPTION

Figure 1:
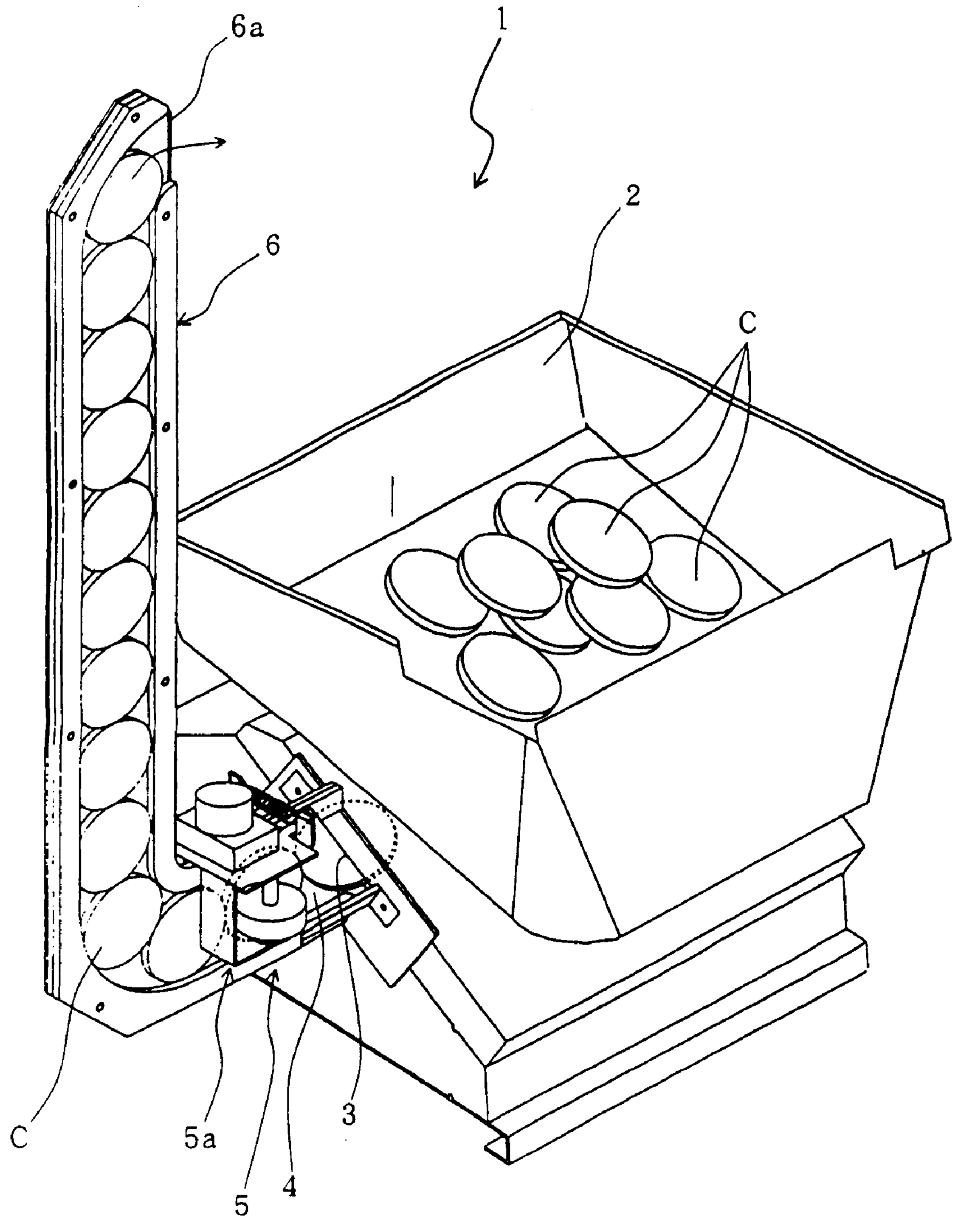
FIG. 1 is an isometric representation of a coin dispenser arrangement constructed in accordance with a specific illustrative embodiment of this invention.

FIG. 1 shows an isometric representation of an "escalator type" coin dispenser arrangement 1 that is constructed in accordance with an illustrative embodiment of this invention. Escalator type coin dispenser arrangement 1 has a bucket portion that includes a bucket 2 for retaining a plurality of coins C. There are additionally provided a coin discharge disk (not shown) that is driven into rotation in a inclined plane in the bucket, and a coin discharge slot 3. A passage 5 is provided for receiving coins C that have been discharged through coin discharge slot 3 and for guiding coins C upward to a predetermined elevated position. Passage 5 has coupled thereto an upward passage 6 for guiding discharged coins C to the predetermined elevated position.

The coins in bucket 2 are carried to coin discharge slot 3 by the coin discharge disk one-by-one and discharged through coin discharge slot 3 into passage 5. Coin discharge slot 3 is oriented diagonally in this embodiment. A coin C is discharged though coin discharge slot 3 in an inclined condition into passage 5. In passage 5, a pair of coin receiving plates 4 (FIG. 5) are connected with coin discharge slot 3 for receiving the coin in the inclined condition. Passage 5 is equipped with a coin orientation adjustment arrangement 5*a* for changing the orientation of coin C discharged through coin discharge slot 3 and for sending it to upward passage 6.

Coin C moves while it is vertically orientated in upward passage 6. Coins C are pushed up from the lower side in upward passage 6 and pushed out of an upper end 6*a* of upward passage 6, one-by-one.

Figure 2:
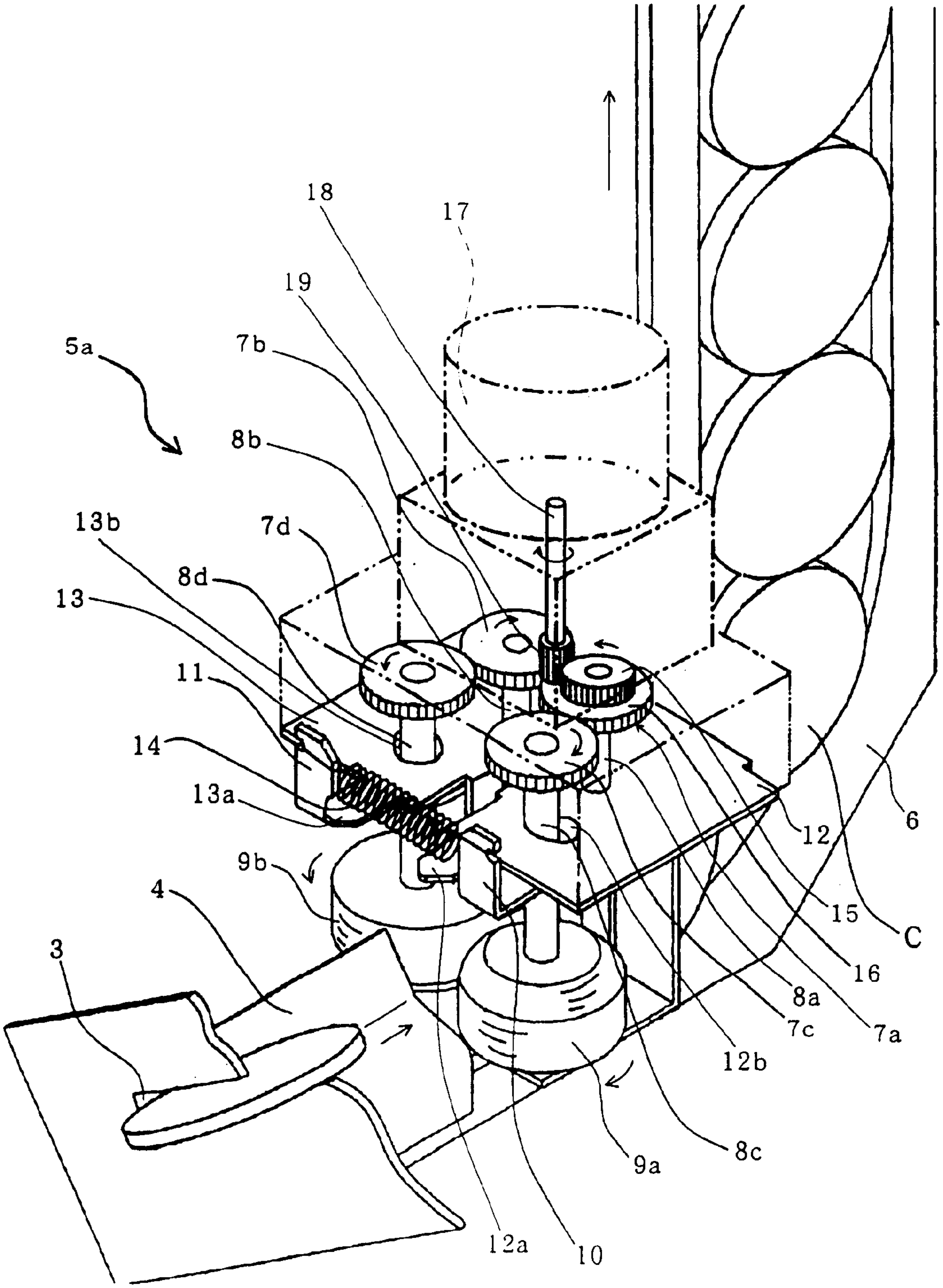
FIG. 2 is an isometric representation of an embodiment of a coin orientation adjustment arrangement in the coin dispenser arrangement of FIG. 1.

FIG. 2 is an isometric representation of an embodiment of the invention, showing coin orientation adjustment arrangement 5*a*.

Figure 3:
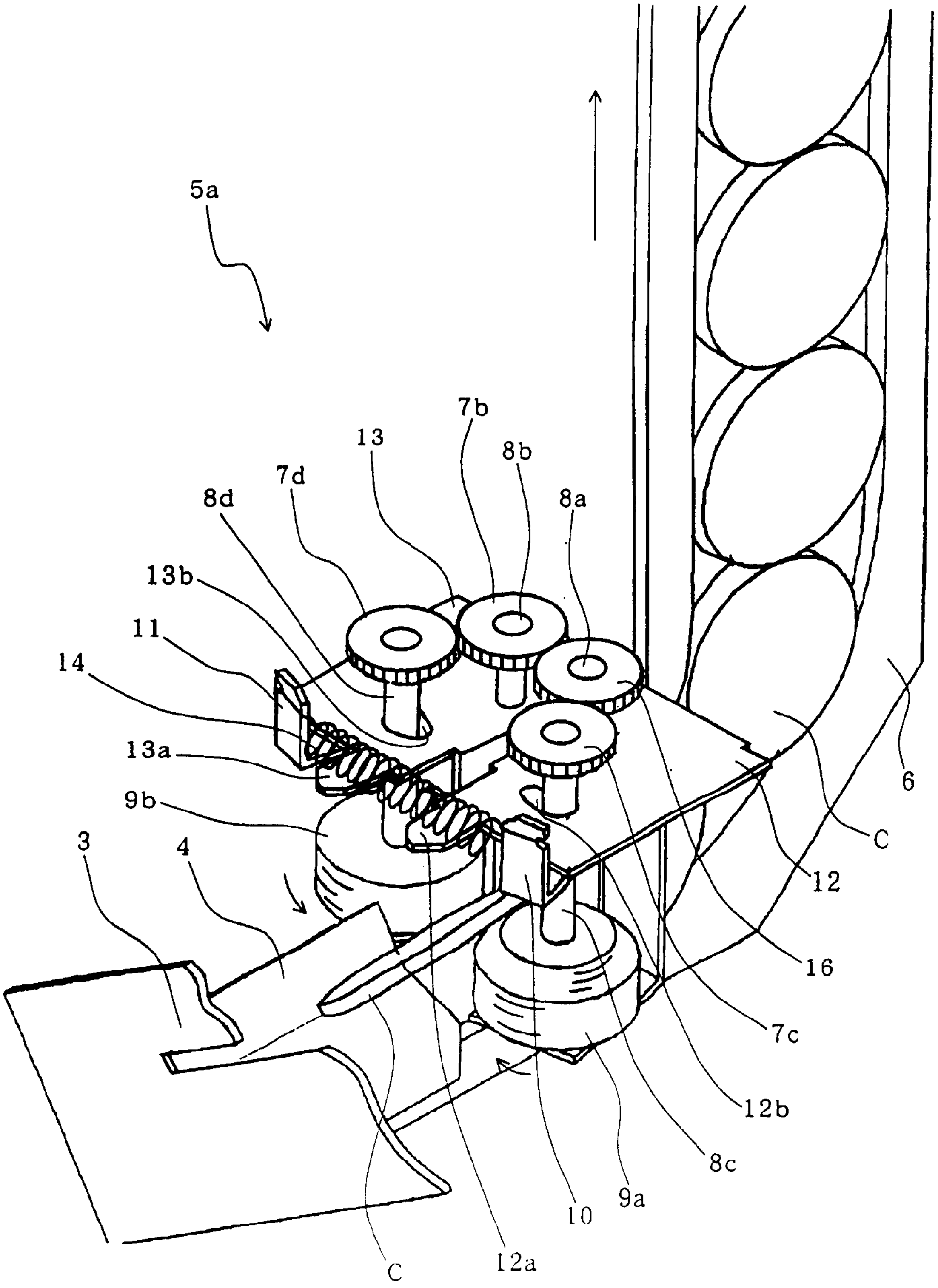
FIG. 3 is an isometric representation of a coin being passed between a pair of rollers of the coin orientation adjustment arrangement of FIG. 2.

FIG. 3 is an isometric representation of coin orientation adjustment arrangement 5*a* in drive.

Figure 4:
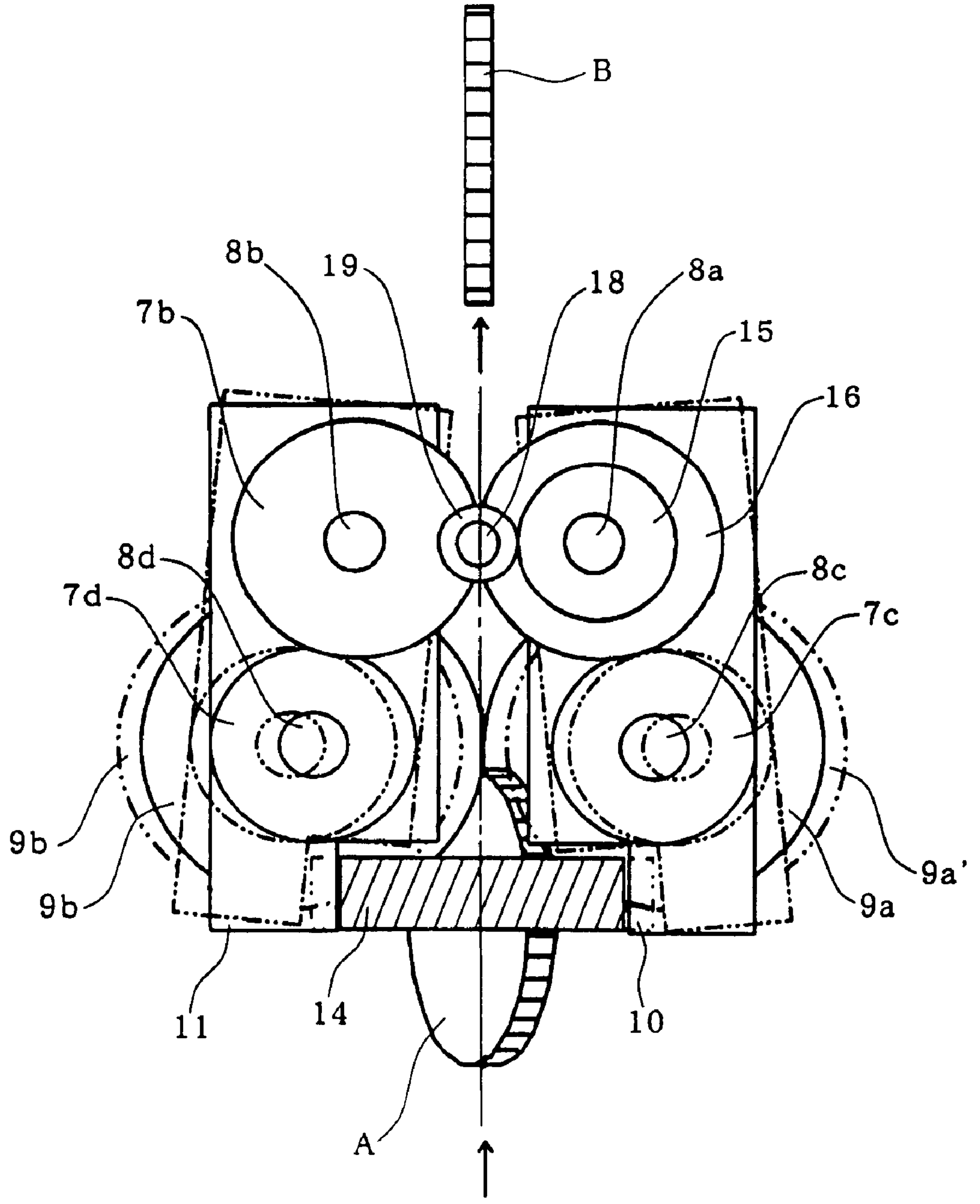
FIG. 4 is a plan representation showing displacement in right and left directions of respective ones of a pair of rollers of the coin orientation adjustment arrangement of FIG. 2.

FIG. 4 is a plan view of coin orientation adjustment arrangement 5*a*.

Figure 5:
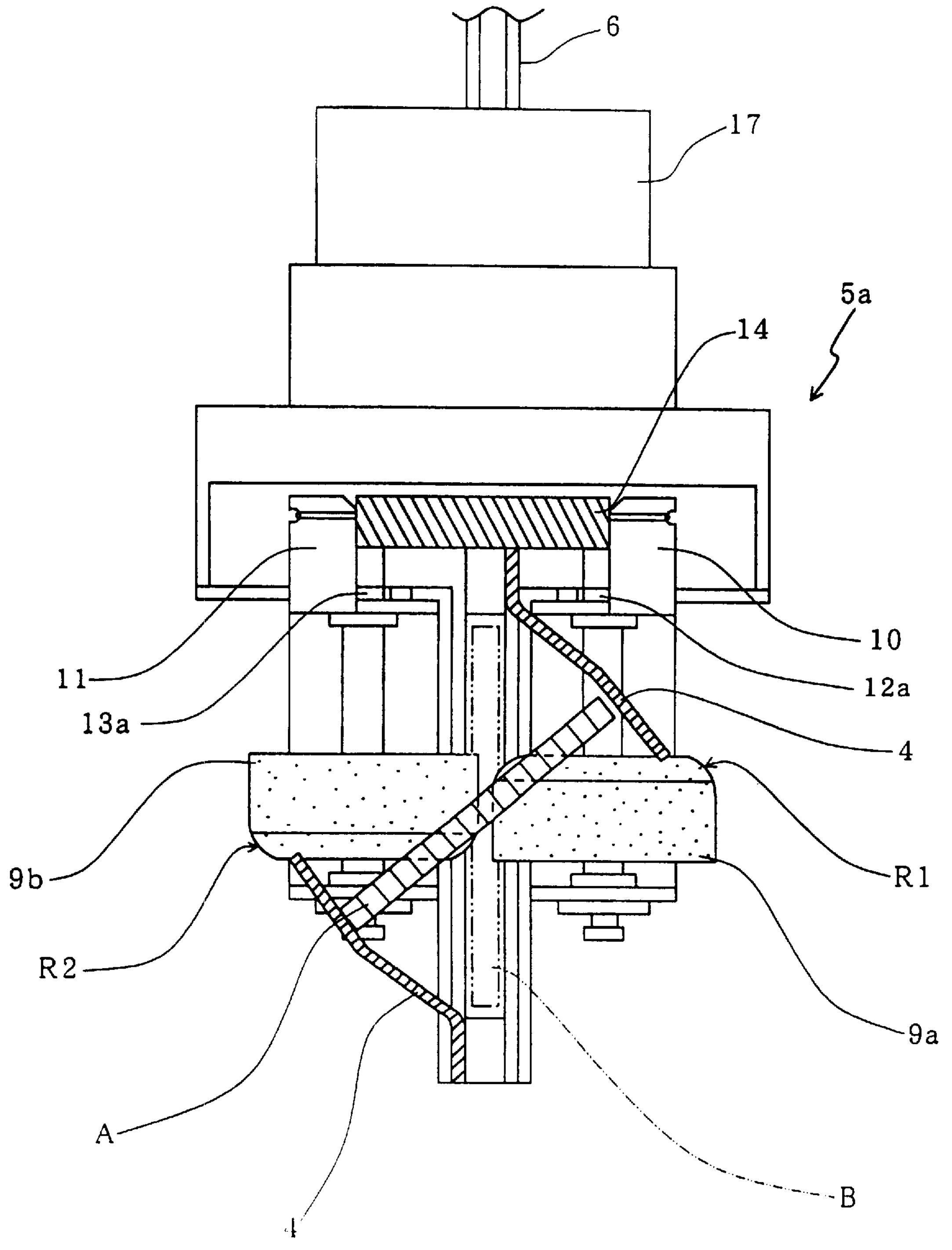
FIG. 5 is a representation of the coin orientation adjustment arrangement of FIG. 2 as viewed from the coin bucket.

FIG. 5 is a front view of coin orientation adjustment arrangement 5*a* viewed from coin discharge slot 3 side.

Rollers 9*a*, 9*b* are disposed on right and left sides, respectively, of the passage to which coin C on coin receiving plate 4 is conducted.

As shown in the front view of FIG. 5, the substantially cylindrical surfaces of rollers 9*a*, 9*b* are vertically arranged so as to face each other, the roller surface of roller 9*a* being chamfered at its upper edge to form a curved surface R1, and the surface of roller 9*b* being chamfered at its lower edge to form a curved surface R2. These curved surface R1, R2 are effective for smoothly urging the inclined coin C on coin receiving plate 4 between rollers 9*a*, 9*b* as will be explained hereinbelow.

Each time a coin is discharged through coin discharge slot 3, the pair of rollers 9*a*, 9*b* are driven into rotation so that each coin thus guided by coin receiving plate 4 is seized quickly by rollers 9*a*, 9*b* and sent to upward passage 6.

In practice, depending upon the status of a game being played, a controller of the gaming machine issues a coin pay out signal that drives the coin discharge disk into rotation, and also drives rollers 9*a*, 9*b* into rotation.

A gear train that is driven by a motor 17 (FIG. 5) as the drive source is provided for rotating the pair of rollers 9*a*, 9*b*. The gear train includes a pinion 19 (FIG. 4) fixed to a rotation output shaft 18 of motor 17, a reduction gear 15 engaged with pinion 19, a first gear 7*a* formed as one body with reduction gear 15, a second gear 7*b* engaged with first gear 7*a*, a roller drive gear 7*c* fixed to a roller shaft 8*c* of roller 9*a*, and a roller drive gear 7*d* fixed to a roller shaft 8*d* of roller 9*b*. First gear 7*a* is engaged with roller drive gear 7*c*. Second gear 7*b* is engaged with roller drive gear 7*d*.

Underneath the gear train, two cover plates 12, 13 (FIG. 3) are provided. Cover plates 12, 13 have perforations through which a shaft 8*a* of first gear 7*a*, a shaft 8*b* of second gear 7*b* and roller shafts 8*c*, 8*d* protrude. Rollers 9*a*, 9*b* are arranged underneath cover plates 12, 13, respectively.

In the gear train, when motor 17 rotates, each gear rotates in a direction shown by a respective arrow shown in FIG. 2, and roller drive gears 7*c*, 7*d* are rotatable simultaneously. As a result, roller 9*a* rotates in the clockwise direction, and roller 9*b* rotates in the counter clockwise direction. A coin C can be urged between rollers 9*a*, 9*b* by rotation of rollers 9*a*, 9*b*.

Under cover plate 12 there is disposed a pivotably displaceable member 10 using shaft 8*a* of first gear 7*a* as the fulcrum and being penetrated by roller shaft 8*c* in a condition where roller shaft 8*c* can rotate. Under cover plate 13 is disposed a pivotably displaceable member 11 using shaft 8*b* of second gear 7*b* as the fulcrum and being penetrated by roller shaft 8*d* in a condition where roller shaft 8*d* can rotate.

Roller shafts 8*c*, 8*d* penetrate through prolonged perforations 12*b*, 13*b* of cover plate 12, 13, respectively, so that roller shafts 8*c*, 8*d* may be displaced simultaneously with respective pivotably displaceable members 10, 11 and the movement thereof may be kept within a proper range.

The coin orientation is preferably changed to vertical as it is passed between rollers 9*a*, 9*b*. It is desirable to nip the coin between the vertical roller surfaces in order to orient the coin vertically. It is also desirable that both faces of the coin communicate with the surfaces of rollers 9*c*, 9*d*, respectively.

Pivotably displaceable members 10, 11 are connected with a coil spring 14 at respective ends thereof spring 14 to be urged resiliently in respective closing directions. Therefore, when the inclined coin C enters the space between rollers 9*c*, 9*d*,the separation therebetween can be enlarged, and when coin C passes between of rollers 9*c*, 9*d*,the separation between rollers 9*c*, 9 is made narrower by operation of coil spring 14.

Cover plates 12, 13 have stoppers 12*a*, 13*a* for limiting the movement of pivotably displaceable members 10, 11 by engaging with the movable ends of members 10, 11, respectively. This maintains a predetermined separation that is necessary for a coin to pass between the pair of rollers 9*a*, 9*b*.

In FIG. 3, a coin C is about to be dragged between rollers 9*a*, 9*b*. The inclined coin enters between rotating rollers 9*a*, 9*b* and urges them apart. Rollers 9*a*, 9*b* are simultaneously urged back by operation of coil spring 14 so that inclined coin C is caught by the roller surfaces of rollers 9*a*, 9*b* to be vertical and is sent to upward passage 6.

The urging of the pair of rollers to the mutually closing direction by the spring can ease a shock force that is caused when a coin that is discharged from the bucket portion is urged between the pair of rollers. Thus, the separation between the pair of rollers may be adjusted so as to realize a smooth coin draw therein and subsequent pushing out.

The movement of rollers 9*a*, 9*b* is explained referring to FIG. 4. In FIG. 4, the coin prior to entering coin orientation adjustment arrangement 5*a* is shown by "A," and the coin urged out of coin orientation adjustment arrangement 5*a* is shown by "B".

When the inclined coin A is forced between rollers 9*a*, 9*b* so as to spread the separation between rollers 9*a*, 9*b*, roller shafts 8*c*, 8*d* move in a direction away from each other with the movement of pivotably displaceable members 10, 11, respectively. As a result, the separation between rollers 9*a*, 9*b* is widened. Double dotted lines of rollers 9*a*', 9*b*' show the positions of rollers 9*a*, 9*b* when rollers 9*a*, 9*b* are displaced to enlarge the distance therebetween.

A coin that is drawn between rollers 9*a*, 9*b* moves in a direction shown by the arrows in the figure.

When the coin enters between rollers 9*a*, 9*b*, the coin is inclined as shown by coin A. However, the coin changes its orientation while passing through between rollers 9*a*, 9*b* and when the coin is sent out of coin orientation adjustment arrangement 5*a*, the coin becomes vertical as shown by coin B. The vertical coin can be sent directly to upward passage 6. Accordingly, it is unnecessary to form a gently sloped curve in the passage for changing the orientation of coin to vertical.

By disposing coin orientation adjustment arrangement 5*a* in the passage near the coin discharge slot and by forming vertically upward passage 6 in front of coin orientation adjustment arrangement 5*a*, there is provided a coin dispenser arrangement that is minimized in size, in which coin jamming hardly occurs, and in which coin travel is minimized as a result of the shortened passage.

The condition where a coin enters coin orientation adjustment arrangement 5*a* from coin receiving plate 4 is explained with reference to FIG. 5. Coin A is directed to coin orientation adjustment arrangement 5*a* in an inclined condition where the coin is raised at the right side by coin receiving plate 4. When coin A enters between rollers 9*a*, 9*b*, coin A contacts curved surface R1 of roller 9*a* at the right side, and coin A contacts curved surface R2 of roller 9*b* on the left side. Because coin A contacts the rotating rollers 9*a*, 9*b* while it is in inclined condition, it can be drawn smoothly between rollers 9*a*, 9*b*.

If the curved surfaces of rollers 9*a*, 9*b* are made large, the vertical roller surfaces necessary for changing the coin orientation to be vertical become too small to change the orientation of a coin to a vertical condition. Accordingly, the shape and size of the rollers are designed so as to draw a coin easily and to be sufficient to change the orientation of the coin.

At least the surfaces of rollers 9*a*, 9*b* are preferably made of an elastic material such as a rubber material or the like for smoothly changing the orientation of the coin and for sending the coins forward.

In the present embodiment of coin orientation adjustment arrangement 5*a*, the roller shafts of rollers 9*a*, 9*b* are movable so that rollers 9*a*, 9*b* can be moved apart or toward each other depending on the force applied. However, the coin dispenser arrangement of the present invention may include a coin orientation adjustment arrangement that has a pair of rollers arranged to be unmovable with a predetermined separation for dragging the inclined coin and changing the orientation of the coin to propel the coin.

In such an embodiment, the orientation of the coin is changed to vertical direction. However, according to the present invention, the orientation of the moving coin may be changed to a desired orientation other than vertical.

In the present embodiment, coin orientation adjustment arrangement 5*a* is disposed in the passage near coin discharge slot 3. In the present invention, the location of the coin orientation adjustment arrangement is not limited, and it can be located at any other location, determined by a person of ordinary skill, where the orientation of the moving coin is desired to be changed.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A coin dispenser arrangement for a gaming machine having a bucket portion for accommodating a plurality of coins and discharging the coins one-by-one, and a passage for guiding the discharged coins in a predetermined direction of movement to a predetermined position, the passage having a coin orientation adjustment arrangement for turning coins about an axis substantially aligned with the direction of movement of the coins to another facing direction, characterized in that the coin orientation adjustment arrangement turns coins about an axis substantially aligned with the direction of movement of the coins during passage between a single pair of rollers arranged at the passage.

2. The coin dispenser arrangement of claim 1, wherein the single pair of rollers are disposed on opposite sides of the passage through which the discharged coin is conducted, the arrangement having a drive source for driving the respective rollers into rotation, the drive source being arranged so that the pair of rollers may be rotated facing each other to introduce or insert the coin between them and send the coin the direction of movement while tuning the coin.

3. The coin dispenser arrangement of claim 2, wherein there is provided a roller shaft for each roller of the pair of roller, the roller shafts being movable and urged toward each other.

4. The coin dispenser arrangement of claim 2, wherein one of the rollers of the pair of rollers is chamfered at the upper edge of its roller surface and the other is chamfered at the lower edge of its roller surface.

5. The coin dispenser arrangement of claim 2 wherein the pair of rollers changes an orientation of the coin at a speed that is responsive to speed of rotation of the pair of rollers.

6. A coin dispensing arrangement for dispensing coins to a payout location from a coin storage container, the coin dispensing arrangement comprising:

- a discharge slot for issuing coins from the storage container in a first orientation;
- a reorienting arrangement for orienting the issued coins in a second orientation, said reorienting arrangement having;
  - first and second rollers arranged to be rotatable in respectively opposite directions so as to draw the coins therebetween, said first roller having a chamfered upper edge and said second roller having a chamfered lower edge, said first and second rollers being resiliently urged toward each other; and
  - a drive arrangement for rotating said first and second rollers in respectively opposite directions; and
- a passageway for conducting the issued coins in the second orientation to the payout location.

7. The coin dispensing arrangement of claim 6, wherein the payout location is elevated with respect to said discharge slot.

8. The coin dispensing arrangement of claim 6, wherein said drive arrangement comprises:

a motor for providing rotatory energy;

a pinion coupled to said motor; and first and second gears coupled to said pinion for receiving the rotatory energy of said motor and delivering same to respective ones of said pair of rollers.

9. The coin dispensing arrangement of claim 8, wherein there is further provided a pair of pivotally displaceable carrier members coupled to respective ones of said first and second gears and said pair of rollers, whereby said pair of rollers are laterally displaceable with respect to each other.

10. The coin dispensing arrangement of claim 9, wherein there is further provided a resilient biasing element coupled to said pair of pivotally displaceable carrier members for urging said pair of rollers toward each other.

11. The coin dispensing arrangement of claim 9, wherein said pair of pivotally displaceable carrier members are arranges to pivot about respective axes of said first and second gears.

12. A coin dispenser arrangement for a gaming machine having a bucket portion for accommodating a plurality of coins and discharging the coins one-by-one, the coin dispensing arrangement further comprising:

a passageway for guiding the coins discharged by the bucket portion in a first direction to a predetermined position, said passageway being configured to deliver the discharged coins to the predetermined position in a first determinable orientation at an angle with respect to the vertical direction, said passageway having first and second sides first and second rollers arranged to be rotatable about respective vertical axes disposed on respective ones of said first and second sides of said passageway, said first roller having a chamfered upper portion and a substantially cylindrical lower portion, and said second roller having a chamfered lower portion and a substantially cylindrical upper portion, the chamfered portions initially communicating with the coins while the coins are in the first determinable orientation and drawing the coins into engagement with the substantially cylindrical portions, whereby the coins are reoriented with respect to the respective vertical axes of said first and second rollers; and a drive source for driving the respective rollers into rotation, said drive source being arranged so that the pair of rollers are rotated to urge the coins in the first direction as they are reoriented.

13. The coin dispenser arrangement of claim 12, wherein there is provided a roller shaft for each roller of the first and second rollers, the roller shafts being movable and urged toward each other.

14. The coin dispenser arrangement of claim 12, wherein the coin orientation adjustment arrangement changes an orientation of the coin at a speed that is responsive to speed of rotation of the pair of rollers.

* * * * *